United States Patent [19]

Thomas et al.

[11] Patent Number: 4,678,577

[45] Date of Patent: Jul. 7, 1987

[54] SEAMLESS VESSEL FOR SELF CONTAINED FILTER ASSEMBLY

[75] Inventors: Dwight J. Thomas, Zionsville; Charles J. Ashelin, Lebanon, both of Ind.

[73] Assignee: Kennecott Corporation, Cleveland, Ohio

[21] Appl. No.: 769,927

[22] Filed: Aug. 27, 1985

[51] Int. Cl.$^4$ ............................................. B01D 27/08
[52] U.S. Cl. .................................. 210/441; 210/446; 210/457; 210/287; 264/251; 264/262; 264/DIG. 48; 55/502
[58] Field of Search ................. 210/DIG. 17, 493.2, 210/446, 457, 541, 542, 287, 441, 437, 441, 484; 264/251, 262, DIG. 48, 266, 267, 279; 55/DIG. 5, 500, 502, 505, 510

[56] References Cited

U.S. PATENT DOCUMENTS

| | | | |
|---|---|---|---|
| 3,186,552 | 6/1965 | Cutler | 55/510 |
| 4,062,781 | 12/1977 | Strauss et al. | 210/446 |
| 4,225,442 | 9/1980 | Tremblay et al. | 210/457 |

FOREIGN PATENT DOCUMENTS

| | | | |
|---|---|---|---|
| 2429474 | 11/1975 | Fed. Rep. of Germany | 210/493.2 |
| 698634 | 11/1979 | U.S.S.R. | 210/493.2 |

Primary Examiner—Richard V. Fisher
Assistant Examiner—Linda S. Evans
Attorney, Agent, or Firm—Burtsell J. Kearns; Gary R. Plotecher; Larry W. Evans

[57] ABSTRACT

A cylindrical pressure vessel housing a filter media wherein the vessel is formed from a tubular thermoplastic pipe portion having opposite conical shaped end portions integrally formed with molded internal base portions with one base portion having integrally molded thereto the filter media in sealed position within the vessel housing.

8 Claims, 3 Drawing Figures

SEAMLESS VESSEL FOR SELF CONTAINED FILTER ASSEMBLY

BACKGROUND OF THE INVENTION

The present invention relates to new and useful improvements in filter assemblies and methods for forming pressure vessel containers for housing the filter assembly.

It is known in the prior art to provide vessels or housings which contain therein a filter element. The filter element may comprise any suitable filter media such as granular absorptive material, or porous sheet material, wound roving or the like disposed in a generally cylindrical form about a central perforated tube member. The filter element is contained within a vessel having a fluid inlet port for receiving a fluid for filtration. The fluid flows radially inward of the filter element with filtrate discharged through the tube member to a discharge port in the vessel housing while solids are retained on the outer surface of the filter media. When the filter element becomes clogged or reaches its solids holding capacity, it is either replaced within the housing or the entire unit is replaced.

In those prior art devices where the filter element is of the replaceable or disposable type the outer vessel housing is usually produced in two sections. The filter element is bonded or welded to the interior of one vessel section and the second vessel section is then welded or adhesively bonded to the first section. The vessel sections are normally injection molded polymer components and are produced in relatively expensive injection molds and injection molding machines.

These filter devices although satisfactory for their intended purposes often encounter manufacturing problems in that the welding or bonding of the vessel sections requires that a joint be designed in such a way as to provide not only a fluid tight seal but have a pressure withstanding capability at least equal to the pressure application of the selected filtration process and in compliance with relevant safety factors. The assembly of the vessel sections is normally accomplished by any number of capital or labor intensive methods such as vibration welding, spin welding, solvent welding, ultrasonic welding, induction welding, hot platen welding, threads and elastomeric seals or adhesive bonding.

It is an object of the present invention to provide a novel filter assembly and pressure vessel for housing the assembly.

Another object is to provide a pressure vessel for housing a filter assembly which is weld free and formed without the use of expensive injection molded polymer components.

A still further object is to provide a novel method and process for forming a pressure vessel closure end and filter element end cap and their interfacial seal in one economical operation.

SUMMARY OF THE INVENTION

The present invention contemplates a novel disposable filtration unit and cylindrical pressure vessel for housing the filter element. The opposite ends of the cylindrical pressure vessel are conical shaped and at the apex of the cones are provided fluid inlet and discharge ports to and from the body of the vessel. A cylindrical filtration cartridge or other filter media is housed within the vessel and has one end sealed and the opposite end integrally attached to the interior surface of one conical end section of the pressure vessel. In the forming of the pressure vessel a mold is charged with a quantity of powdered thermoplastic polymer which is heated and held at a temperature above the melting point of the polymer. The main portion of the vessel which is formed from a precut thermoplastic pipe of the same or compatible polymer is placed into the open mold together with one end of the filter media contacting the molten polymer. The ends of the pipe are melted and conform to the shape of the mold and form the major portion of the conical end of the vessel. The mold is quickly cooled and the polymers solidified to form an inner base section of the vessel and seal the filter media in place. The opposite conical end portion of the vessel is formed in a similar manner but is spaced from the filter media.

The above and other objects and advantages of the present invention will appear more fully hereinafter from a consideration of the detailed description which follows taken together with the accompanying drawing wherein two embodiments of the present invention are illustrated.

DETAILED DESCRIPTION

Figure 1:
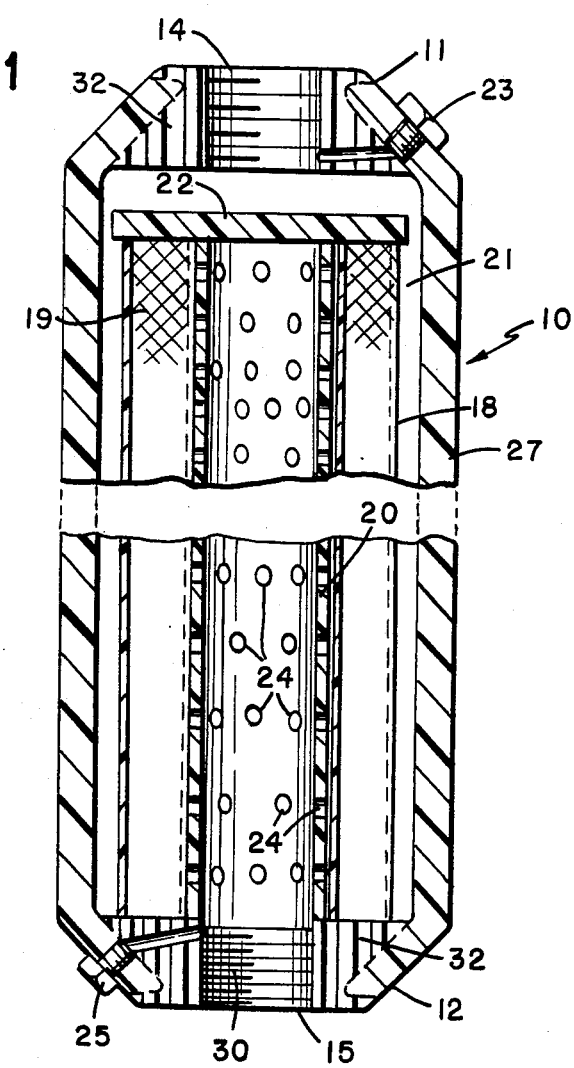
FIG. 1 is a cross-sectional elevational view of a pressure vessel and contained filter element embodying an embodiment of the present invention.

Referring now to the drawings for a more detailed description of the present invention, a pressure vessel incorporating an embodiment thereof is schematically illustrated and generally indicated by reference numeral 10. Vessel 10 comprises a cylindrical housing having opposite conical end portions 11 and 12 respectively with a fluid inlet port 14 in upper end portion 11 (FIG. 1) and a fluid discharge port 15 in lower end portion 12.

A filter media is housed within vessel 10 and may contain any suitable media such as a charge of granular absorptive or packed filter media, such as activated carbon, Fuller's earth, activated alumina or an ion exchange media, exclusively or in combination, which may be contained within the vessel by woven or non-woven coarse filter pads (not shown) covering the inlet and discharge ports, 14, 15. In FIG. 1 the filter media is illustrated as comprising a filter cartridge 18 comprised of roving 19 wound in a criss-cross manner about a central perforated tube element 20 to provide a plurality of diamond shaped filter passageways 21 from the outer periphery of the filter cartridge 18 to the center tube 20 in a well known manner. The upper end of filter cartridge 18 is provided with a closed end cap 22. The lower end of tube 20 communicates with and is attached to discharge port 15 in a manner to be described in further detail and vent or drain openings 23, 25 are provided in upper and lower end portions 11 and 12 respectively.

In use of filter cartridge 18 the solids containing fluid enters inlet port 14 of vessel 10. Solids are retained by roving 19 of cartridge 18 while filtrate passes through diamond passageways 21 through perforations 24 in tube 20 for discharge from vessel 10 through discharge port 15.

As mentioned it is a feature of the present invention to provide a novel method or process for forming vessel 10 to provide weld free one piece pressure vessel. To this end vessel 10 is formed in the following manner. An open mold 28 (FIG. 2) is provided with a conical mirror image shape of the desired vessel end 11 or 12. Mold 28 has a central threaded post 29 which forms the vessel ports 14 or 15 and connecting threads 30. In the vessel forming process mold 28 is charged with a quantity of powdered thermoplastic polymer. Mold 28 is held at a temperature above the melting point of the polymer.

Figure 2:
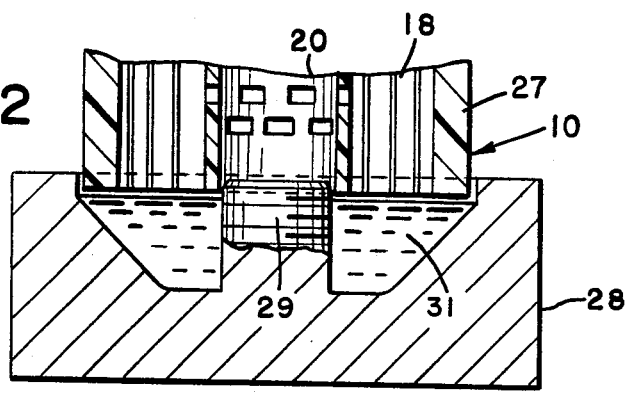
FIG. 2 is an enlarged view of the lower portion of the vessel of FIG. 1 prior to insertion into the forming mold.

The main body portion of vessel 10 comprises a precut thermoplastic pipe 27 of the same or compatible polymer to the molten polymer (designated by the reference numeral 31 in FIG. 2) and of a preselected diameter desired for vessel 10. As seen in FIG. 2 with respect to the lower end of pipe 27 the latter is placed into open mold 28 contacting the molten polymer 31. Mold 28 and pipe 27 are then placed into a heated press (not shown) and pressure applied for a selected period of time whereby the ends of pipe 27 contained within mold 28 softens and blends with the molten polymer 31 to form the conical end portion 12 of vessel 10 as seen in FIG. 2.

The molten polymer 31 in the process forms around the threads of port 29. The lower end of cylindrical filter cartridge 18 is pressed into the pool of molten polymer 31 around the post 29 with the lower end of center tube 20 contacting the top of post 29. The open mold is quickly cooled and the solidified vessel end removed from the mold with molten polymer 31 having solidified to seal both the lower end of cartridge and inner side walls of section 12 to form a solidified integral base section 32 within conical section 12. The upper conical end 11 is formed in a similar manner but with filter cartridge 18 spaced from solidified base section 32.

The process described herein allows for manufacture of completed vessels of any incremental length from approximately three inches to approximately fifty inches, and incremental vessel diameters of standard or non-standard pipe sizes from two inches to approximately six inches. Incremental vessel wall thickness from 0.125 L inches to 0.5 inches can be tolerated.

Pipe 27 may be constructed of any thermoplastic polymer which is determined by its intended end use. Thermoplastic polymer being any polymer capable of being repeatedly softened by heat and hardened by cooling. Typical examples of thermoplastics are the styrene polymers and copolymers, acrylics, cellulosics, polyethylenes and polypropylenes, vinyls, nylons, saturated polyesters, as well as various fluoropolymers and polysulfones.

In one example of forming vessel 10, open mold 28 was charged with thermoplastic resin powder of particle size fine enough to prevent excessive air bubble formation during melt with a melt flow index being not less than 15, and preferably above 25. Resin powder may be 100% virgin material or may be mixed with fine particles of an inert coloring compound such as carbon black to afford opacity, or cosmetic coloring. Coloring compound content may be from 0-0.5% by weight, and its particle size should approach 0.018 micron.

The draft angle of center post 29 is a minimum of 2 degrees to facilitate removal of cooled assembly. The mold cavity is a mirror image of the desired conical ends 11 or 12 and in one product has a major diameter approximately 0.010 inches greater than outside diameter of pipe 27 with a cone wall angle of 2 degrees to 50 degrees from vertical. Wall angle transition planes at the top of the cavity and at cone truncation is radiused a minimum of 0.375 inches. Mold cavity depth in the range from 25% to 45% of diameter of pipe being inserted, more preferably 30-35%. The entire mold cavity is filled with polymer. One mold design for capping 3.5" outside diameter pipe has a major diameter of 3.510 inches, wall angle of 40 degrees, transitions radiused at 0.575 inches, and mold depth of 1.063 inches. Center post 29 is externally threaded for ½-inch tapered pipe thread, and extends 1.0 inches above mold cavity.

Once the mold 28 is charged with powdered resin, it is placed in an enclosed heating chamber in order to melt the polymer and bring it to the desired processing temperature and viscosity. Heating chamber may consist of a covered hot plate, enclosed quartz heater, a standard convection oven, or any other enclosed device capable of generating space temperature up to approximately 800 degrees F. Provisions for inert atmosphere may be required, depending on the polymer being used.

Temperature of polymer charge is raised to a point from 35 degrees F. to 150 degrees F. above its crystalline melting temperature and held there for not more than 5 minutes to minimize polymer heat degradation. One end of the pre-formed, pre-cut thermoplastic pipe 27 is then inserted in the top of mold 28 in contact with the molten polymer 31 and downward force is exerted on the opposite end of pipe 27, forcing the pipe 27 to penetrate the molten polymer 31 while conforming to the conical shape of the mold cavity. Provision must be made to maintain the elevated mold temperature stated earlier during this phase of the process. Heat is transferred through the mold and molten polymer 31 to the pipe wall in the vicinity of the mold, causing softening and surface melting only. The pipe thus undergoes controlled deformation while under pressure, and the melted surface of the pipe wall can fusion bond to the molten polymer in the mold during penetration. The actual processing temperature has a marked effect on other process parameters, namely molding pressure and process time, as well as mechanical strength of the completed vessel. Too high a process temperature will cause excessive softening of the thermoplastic pipe wall when inserted into the mold cavity and, consequently, it will not retain enough rigidity under pressure to penetrate and bond to the molten mold charge. Rather, the pipe wall will actually melt and, under process pressure, it will merely be displaced outside the mold cavity and/or over the top surface of the molten polymer charge, resulting in a poor bond.

The downward force applied to pipe 27 during this phase of the process must be great enough to overcome the resistance to movement contributed by friction against the wall of the mold cavity as the pipe softens and deforms. It must also overcome the frictional and buoyant forces contributed by the viscous molten polymer charge the pipe is penetrating. Additionally, it is dependent on process temperature in that the force must result in high enough pipe travel speed to prevent pipe wall from oversoftening.

As an example of the above parameters one vessel design requires a process temperature of 450 degrees F. and 165 lbs. downward force during assembly when using polypropylene pipe and mold charge. Linear pipe displacement for each end is equal to the vertical depth of the end mold being used.

When the assembly is cooled for approximately 10–15 minutes for a pipe of 3.5 inch outside diameter, it is removed from the mold cavity. If the mold center post 29 is threaded, removal must take the form of simultaneous turning and lifting of the pipe in order to prevent damage to now molded threads. Preferably, a lead-screw guide de-molding fixture should be used.

Finally, any excess polymer flash at the pipe to end cap joint is removed. The entire operation is repeated for the remaining opposite pipe end 11, omitting the steps for attachment of the filter cartridge. If vessel 10 is to be charged with granular or packed filter media, a disc-shaped coarse filter pad, approximately ½ inch thick (not shown), and pre-cut so as to form a tight friction fit with interior pipe wall is inserted and seated against the formed pipe end before the remaining pipe opening is end capped. After both ends of pipe are capped, the vessel is then filled with media and another filter pad is forced through the remaining opening and allowed to expand inside the vessel, sealing the media within.

Figure 3:
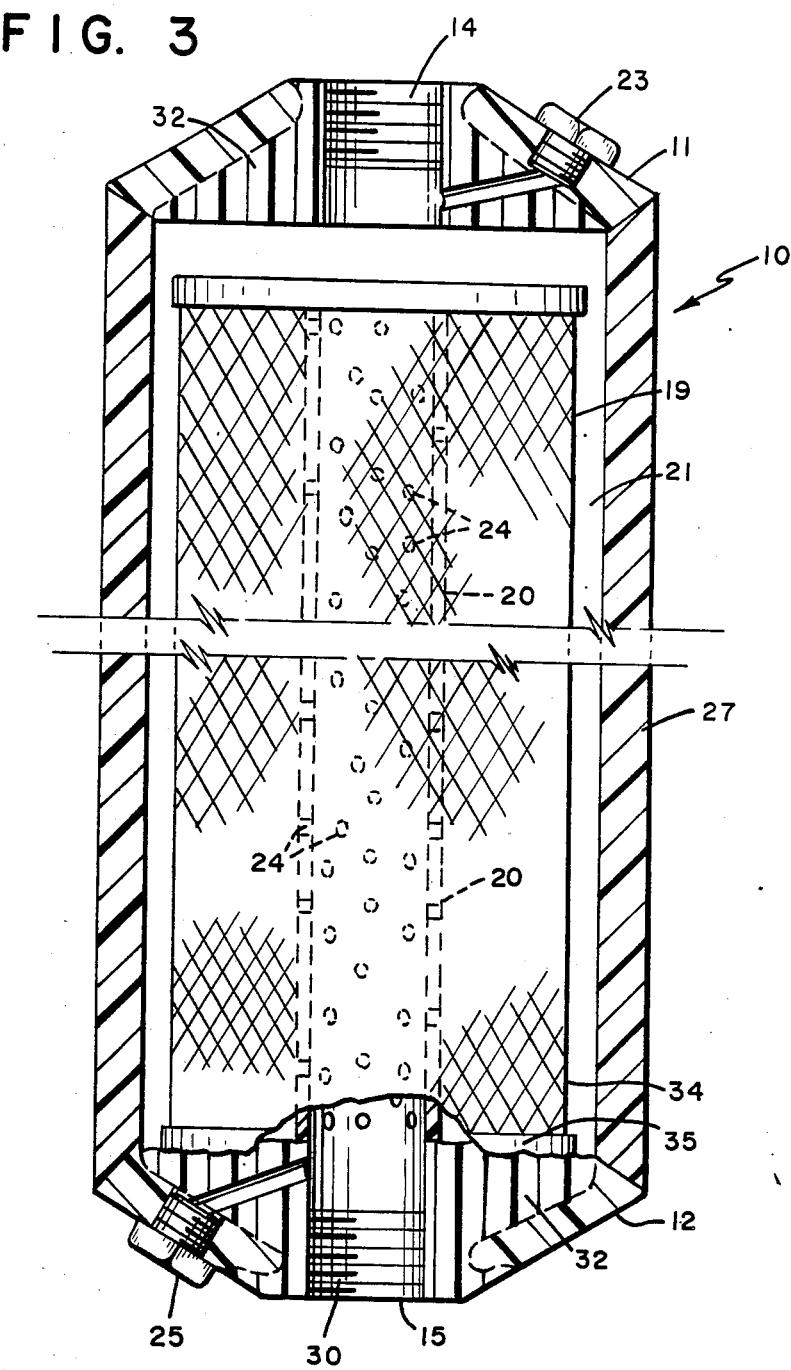
FIG. 3 is a view similar to FIG. 1 showing another embodiment of the present invention.

In the embodiment of FIG. 3 a modified filter cartridge 34 is shown and is similar in construction to the previously described cartridge 18 and like reference numerals are used to indicate the previously disclosed structure.

Filter cartridge 34 differs from cartridge 18 in that cartridge 34 is provided with a bottom thermoplastic end cap 35 and is fitted over the lower end of filter cartridge 34. In the molding process for lower section end of vessel 10 the rim portion of cap 35 partially enters polymer pool 31, is melted and solidifies into base section 32 upon cooling to seal cartridge 34 within vessel 10.

It will be apparent from the foregoing description that the novel pressure vessel and self-contained filter assembly have many advantages in use. One of these advantages is that an economical weld free filter assembly and a pressure vessel is provided using low cost tooling without the use of expensive injection molded polymer components. In addition a process is provided for forming vessel 10 and the lower end of the filter element in the interfacial sealed relationship in one economical operation.

Although only two embodiments of the present invention have been described in detail, it is to be expressly understood that the invention is not limited thereto. Various changes can be made in the design and arrangement of parts without departing from the spirit and scope thereof as the same will now be understood by those skilled in the art.

What is claimed is:

1. A filter assembly comprising:
   a. a seamless main cylindrical vessel having wall portions with opposite conical shaped end portions and formed from a thermoplastic polymer material,
   b. means defining a fluid inlet opening in one of said end portions and means defining a filtrate discharge outlet at the other end portion of said vessel,
   c. a filter media arranged within said vessel,
   d. a molded base section of thermoplastic polymer material in each of said end portions integrally merged to said wall portions of said vessel end portions, and
   e. at least one end of said filter media integrally molded to one of said base sections in sealed position within said vessel.

2. The filter assembly of claim 1 wherein said filter media comprises an absorptive packed filter media.

3. The filter assembly of claim 1 wherein said filter media comprises a filter cartridge having a filter material disposed about a center support filtrate tube with said filtrate tube molded to said means defining said filtrate discharge outlet.

4. The filter assembly of claim 3 wherein said filter media further comprises a roving material wound about said center support filtrate tube and defines a plurality of diamond shaped filtrate passages opening to perforations defined by said center support filtrate tube and wherein one end portion of said roving material is included in the one end of said filter media integrally sealed to said base section of the conical end portion.

5. The filter assembly of claim 3 wherein the opposite ends of said filter cartridge are provided with cap members and one of said cap members is molded to one of said base sections of the discharge end portion of the filter assembly to fix and seal said filter cartridge within said filter assembly.

6. A method for forming a filter assembly including a seamless pressure vessel for housing therein a filter media, comprising the steps of charging a process mold of conical shaped configuration with a quantity of powdered thermoplastic polymer, placing one end of a pre-cut thermoplastic pipe into said mold under pressure for a selected period of time whereby the end of the pipe within said mold softens and blends with the molten polymer to form a conical end portion of the vessel and simultaneously placing one end of a filter media in said molten polymer, cooling the mold, removing the vessel end from said mold with said one end of said filter media molded therein, placing the opposite end of the pipe in a mold containing molten polymer to form the opposite conical end portion of said pressure vessel, cooling the mold, and removing said opposite end from said mold.

7. The method of claim 6 wherein the filter media is wound about a center tube and includes the further step of placing the end of said center tube adjacent said one end of said filter media into contact with said molten polymer to seal said center tube thereto.

8. The method of claim 7 wherein the mold is provided with a center core member which includes placing the center tube into contact with the core member to form an outlet in said vessel housing.

* * * * *